United States Patent [19]
Oono et al.

[11] Patent Number: 6,128,899
[45] Date of Patent: Oct. 10, 2000

[54] EXHAUST GAS PURIFICATION SYSTEM FOR INTERNAL COMBUSTION ENGINE

[75] Inventors: Hiroshi Oono; Masahiro Sakanushi; Nobuaki Takaoka; Toshikatsu Takanohashi, all of Wako, Japan

[73] Assignee: Honda Giken Kogyo Kabushiki Kaisha, Tokyo, Japan

[21] Appl. No.: 09/288,510

[22] Filed: Apr. 8, 1999

[30] Foreign Application Priority Data

Apr. 17, 1998 [JP] Japan .................... 10-124318
Oct. 19, 1998 [JP] Japan .................... 10-315473

[51] Int. Cl.[7] .................................................. F01N 3/00
[52] U.S. Cl. .................. 60/295; 60/274; 60/285; 123/325; 123/326
[58] Field of Search .................. 60/274, 285, 286, 60/295, 301; 123/325, 326, 682

[56] References Cited

FOREIGN PATENT DOCUMENTS 7-217474  8/1995  Japan .
2586739  12/1996  Japan .
2692530  9/1997  Japan .

*Primary Examiner*—Teresa Walberg
*Assistant Examiner*—Shawntina Fuqua
*Attorney, Agent, or Firm*—Arent Fox Kintner Plotkin & Kahn, PLLC

[57] ABSTRACT

A system for purifying exhaust gas of an internal combustion engine having a NOx reduction catalyst (NOx absorber) installed in the exhaust system of the engine which absorbs NOx in the exhaust gas generated by the engine in a lean environment where a lean fuel mixture is supplied and desorbs to reduce the absorbed NOx in a rich environment where a rich mixture is supplied. In the system, the rich fuel mixture is supplied for a period immediately before cutoff. With the arrangement, the NOx reduction catalyst desorbs the absorbed NOx and is regenerated to absorb NOx sufficiently. At the same time, the NOx reduction catalyst is regenerated from sulfur poisoning, thereby preventing the NOx purification efficiency from being degraded.

23 Claims, 9 Drawing Sheets

EXHAUST GAS PURIFICATION SYSTEM FOR INTERNAL COMBUSTION ENGINE

BACKGROUND OF THE INVENTION

1. Field of the Invention

This invention relates to an exhaust gas purification system for an internal combustion engine, particularly to an exhaust gas purification system for an internal combustion engine that has a NOx reduction catalyst (NOx absorber).

2. Description of the Related Art

Recently, the move toward leaner fuel mixture supply controls (in which the air/fuel ratio is regulated leaner than a stoichiometric air/fuel ratio) has created a need for an exhaust gas purification system that has a NOx reduction catalyst (or a NOx absorber) to purify oxides of nitrogen (hereinafter referred to as "NOx") constituent in the exhaust gas, since a greater amount of NOx is generated with the lean fuel mixture.

The NOx reduction catalyst operates to absorb NOx when the engine fuel mixture is set to lean (i.e., in an oxidizing environment where an increased amount of NOx is generated and the oxygen concentration is relatively high) and then to desorb the absorbed NOx when the fuel mixture is rich (where the amounts of hydrocarbon (hereinafter referred to as "HC") constituent and carbon monoxide (hereinafter referred to as "CO") constituent are increased and the oxygen concentration is low). The desorbed NOx is reduced by HC and CO and is emitted into the atmosphere as nitrogen gas, while HC and CO are oxidized and are emitted into the atmosphere as vapor and carbon dioxide.

Since the amount which the NOx reduction catalyst can absorb NOx is limited, as a matter of fact, the lean fuel mixture supply control should not be continued for a long period.

In order to regenerate or renew the NOx reduction catalyst, it has been taught in Japanese Patent No. 2586739, for example, to temporarily enrich the air/fuel ratio beyond the stoichiometric air/fuel ratio to regenerate the NOx reduction catalyst, i.e., to desorb the NOx absorbed into the NOx reduction catalyst so as to reduce it with the rich fuel mixture. This temporary air/fuel ratio enrichment for this purpose is hereinafter referred to as "fuel mixture enrichment for regeneration" or "rich fuel mixture supply control".

Specifically, in this prior art, the amount of NOx absorbed into the NOx reduction catalyst is estimated based on the engine load and engine speed during the lean fuel mixture supply control and the fuel mixture enrichment for regeneration is conducted each time the estimated amount has reached a predetermined amount.

Another Japanese Patent, No. 2692530, discloses a similar fuel mixture enrichment for regeneration. In this prior art, the fuel mixture is temporarily enriched beyond the stoichiometric fuel mixture and is then regulated to the stoichiometric fuel mixture when the engine operation shifts from the lean fuel mixture supply control to the stoichiometric (or therearound) fuel mixture supply control.

However, when the engine operation shifts from the lean fuel mixture supply control to the fuel cutoff control (in which the supply of fuel mixture into the engine cylinder is discontinued), the exhaust gas purification efficiency may sometimes be degraded, unless the fuel mixture enrichment for regeneration is unexpectedly conducted immediately before the fuel cutoff control. This is because the NOx absorbing capability of the catalyst is likely to drop during the fuel cutoff due to the change in the catalyst temperature and some similar factors. Therefore, when the engine operation returns from the fuel cutoff control to the lean fuel mixture supply control, the NOx absorption of the catalyst sometimes becomes insufficient, thereby degrading the exhaust gas purification efficiency.

Moreover, the fuel includes sulfur constituents (hereinafter referred to as "S"). S acts with the oxides and is absorbed as sulfur oxides constituent (hereinafter referred to as "SOx") on the surface or in the micropores of a catalyst, and this also degrades catalyst purification efficiency. In particular, SOx is likely to stick to this type of NOx reduction catalyst and poison the same to degrade the NOx purification efficiency of the catalyst.

The temperature range of the NOx reduction catalyst suitable for NOx absorption or desorption is, approximately from 250° C. to 550° C. The catalyst temperature range suitable for regenerating from sulfur poisoning is beyond the above-mentioned range, and is approximately 600° C. in a rich environment. If the catalyst temperature is raised to approximately 700° C., regeneration from sulfur poisoning will be conducted more effectively. It should be noted that the temperature ranges mentioned above are examples and they depend on the specification of the catalyst.

Such a regeneration from sulfur poisoning is conducted, similarly to the NOx reduction enrichment, by enriching the fuel mixture to raise the catalyst temperature. However, since the aforesaid prior art (i.e., 2692530) is configured such that upon the termination of fuel cutoff, a rich fuel mixture is supplied and a stoichiometric fuel mixture is then supplied, as shown in FIG. 7 of this prior art, it fails to raise the NOx reduction catalyst temperature to a sufficient extent. As a result, this prior art would leave much to improve effective NOx desorption, and the regeneration from sulfur poisoning, if intended, by the same process.

BRIEF SUMMARY OF THE INVENTION

An object of this invention is therefore to solve the problems of the prior art and to provide an exhaust gas purification system of an internal combustion engine having a NOx reduction catalyst, which conducts the fuel mixture enrichment for regeneration before the fuel cutoff control so as to conduct regeneration for the NOx reduction and regeneration from sulfur poisoning effectively, thereby preventing the exhaust gas purification efficiency from being degraded.

Another object of this invention is to provide an exhaust gas purification system of an internal combustion engine having a NOx reduction catalyst, which conducts the fuel mixture enrichment for regeneration before the fuel cutoff control so as to prevent the NOx purification efficiency from being degraded, in particular when the engine operation returns from the fuel cutoff control to the lean fuel mixture supply control, thereby preventing the exhaust gas purification efficiency from being degraded.

Still another object of this invention is to provide an exhaust gas purification system of an internal combustion engine having a NOx reduction catalyst, which conducts the fuel mixture enrichment for regeneration before the fuel cutoff control to conduct regeneration from sulfur poisoning so as to prevent the exhaust gas purification efficiency from being degraded.

To achieve the objects the present invention provides a system for purifying exhaust gas of an internal combustion engine, including a NOx absorber (NOx reduction catalyst 24) installed in an exhaust system (exhaust pipe 22) of the engine (10) which absorbs NOx in exhaust gas generated by the engine in a lean environment and desorbs to reduce the absorbed NOx in a rich environment; vehicle driving condition detecting means for detecting a driving condition of a vehicle on which the engine is mounted (throttle position sensor 42, etc.); and fuel cutoff determining means (ECU 60, S10, S100–S122, S14, S200) for determining whether a condition for fuel cutoff in which supply of fuel to the engine is cut off, is met based on at least the detected driving condition of the vehicle; characterized in that the system comprises: rich fuel mixture supplying means (ECU 60, S18, S202–208) for supplying a fuel mixture richer than a stoichiometric fuel mixture to the engine for a first period (TRICH) if the condition for fuel cutoff is met when a fuel mixture leaner than the stoichiometric fuel mixture is supplied to the engine; and fuel cutoff conducting means (ECU 60, S14) for conducting the fuel cutoff after the supply of rich fuel mixture to the engine has been terminated.

BRIEF EXPLANATION OF THE DRAWINGS

This and other objects and advantages of the invention will be made more apparent with the following description and drawings, in which.

DETAILED DESCRIPTION OF THE PREFERRED EMBODIMENTS

Embodiments of the exhaust gas purification system of an internal combustion engine according to the invention will now be explained with reference to the attached drawings.

Figure 1:
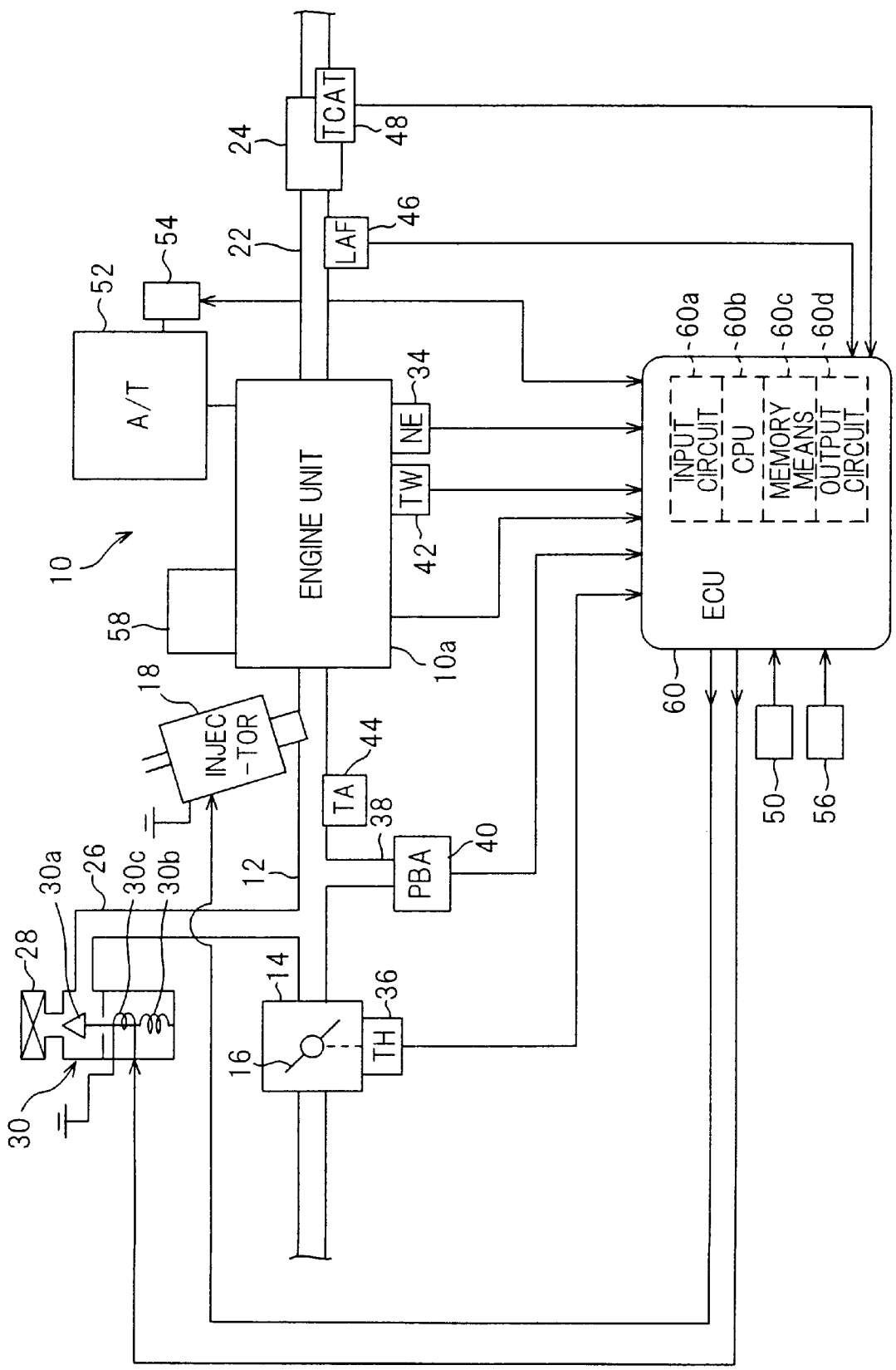
FIG. 1 is a schematic overview showing an exhaust gas purification system of an internal combustion engine according to the invention.

FIG. 1 is a schematic overview of the system.

Reference numeral 10 in this figure designates an OHC in-line four-cylinder internal combustion engine and 10a designates a main unit of the engine 10. Air drawn into an air intake pipe 12 through an air cleaner (not shown) mounted on its far end is supplied to the first to fourth cylinders through a surge tank and an intake manifold (neither shown), while the flow thereof is adjusted by a throttle valve 16 housed in a throttle body 14.

A fuel injector 18 is installed in the vicinity of the intake valve (not shown) of each cylinder and injects fuel which is supplied under pressure by a fuel pump (not shown) from a fuel tank (not shown). The injected fuel mixes with the intake air to form an air-fuel mixture that is ignited in the associated cylinder by a spark plug (not shown). The resulting combustion of the air-fuel mixture drives down a piston (not shown).

The exhaust gas produced by the combustion is discharged through an exhaust valve, an exhaust manifold (neither shown) and an exhaust pipe 22 to a NOx reduction catalyst (NOx absorber or exhaust gas purification system) 24 having the three-way catalytic function, to be purified and then discharged to the atmosphere.

The NOx reduction catalyst 24 is of the type described earlier with reference to Japanese Patent Nos. 2586739 and 2692530 and that described in Japanese Laid-open Patent Application No. 7 (1995) - 217474. The NOx reduction catalyst 24 operates to absorb NOx when the engine fuel mixture is set to be leaner than the stoichiometric value (e.g., 14.7 :1), in an oxidizing environment where an increased amount of NOx is generated, and to desorb the absorbed NOx when a rich fuel mixture, where the air/fuel ratio is set to be richer than the stoichiometric value, is present (i.e., in an environment in which the oxide concentration is low where HC and CO are increased). The desorbed NOx is reduced by HC and CO and is emitted from the engine 10 as nitrogen gas, while HC and CO are oxidized and are emitted from the engine 10 as water vapor and carbon dioxide. This type of catalyst is likely to desorb the absorbed NOx as the catalyst temperature rises.

Alternatively, the NOx reduction catalyst 24 may be of the type which absorbs and stores NOx in the lean environment and desorbs NOx in the rich environment. This type of catalyst (hereinafter referred to as "absorbing-and-storing type") desorbs NOx even under the lean environment if the oxide concentration drops to decrease the amount of NOx to be produced.

The first type of the NOx reduction catalyst is made using sodium (Na) and titanium (Ti), or strontium (Sr) and titanium (Ti). The second type (absorbing-and-storing type) the catalyst 24 is made using barium oxide (BaO). Both types of catalysts use platinum (Pt) as a catalyzer.

The air intake pipe 12 is branched between the locations where the throttle valve 16 and the injectors 18 are placed, to provide a bypass air passage 26. An air cleaner 28 is installed at the distal end (opened to the atmosphere) of the bypass air passage 26 and an electromagnetic air control valve (EACV) 30 is equipped in the passage 26. The EACV 30 is a normally-closed magnetic valve which has a valve body 30a for changing the amount of opening of the passage 26 continuously, a spring 30b for biasing the valve body 30a in the closed direction and an electromagnetic solenoid 30c for moving the valve body 30a in the opening direction against the spring force when energized.

As shown in the figure, the engine 10 is provided with a crank angle sensor 34 (shown as "NE" in the figure) in the vicinity of the cam shaft or the crankshaft (neither shown) for generating a cylinder discrimination signal at a prescribed crank angle of a prescribed cylinder, a TDC (Top Dead Center) signal once at prescribed crank angles before the TDC of every cylinder, and a CRK signal once at subdivisions thereof.

A throttle position sensor 36 (shown as "TH" in the figure) is associated with the throttle valve 16 and generates a signal corresponding to the degree of opening TH of the throttle valve 16. A manifold absolute pressure sensor 40 (shown as "PBA" in the figure) is provided in the air intake pipe 12 downstream of the throttle valve 16 and generates a signal corresponding to the manifold absolute pressure PBA in the intake pipe 12.

A coolant temperature sensor 42 (shown as "TW" in the figure) comprised of a thermistor is provided at an appropriate location of the cylinder block (not shown) and generates a signal corresponding to the engine coolant temperature TW. An intake air temperature sensor 44 (shown as "TA" in the figure) is provided downstream of the manifold pressure sensor 40 and generates a signal corresponding to the temperature of the intake air TA.

Further, a universal air/fuel ratio sensor 46 (shown as "LAF" in the figure) is provided in the exhaust system downstream of the confluence point of the exhaust manifold and upstream of the NOx reduction catalyst 24 and generates a signal proportional to the oxygen concentration of the exhaust gas. A second temperature sensor 48 (shown as "TCAT" in the figure) is installed in the close proximity of the NOx reduction catalyst 24 and generates a signal indicative of the catalyst temperature (or exhaust gas temperature) TCAT.

Moreover, a vehicle speed sensor 50 is provided in the proximity of the drive shaft (not shown) of a vehicle (not shown) on which the engine 10 is mounted, and generates a signal once per unit shaft rotation indicative of a traveling speed V of the vehicle. The engine 10 is connected to an automatic transmission 52 (shown as "A/T" in the figure) which has four-speed gears and receives the output of the engine 10. The automatic transmission 52 is equipped with a shift controller 54 which is comprised of a microcomputer. The shift controller 54 determines the gear ratio, by retrieving a value from a gearshift scheduling map (not shown) by the detected vehicle speed V and throttle opening TH, to transmit the engine power to the wheels (not shown).

A grade sensor 54 is installed at an appropriate location on the vehicle and generates a signal indicative of the grade or slope of a hill (road) on which the vehicle is traveling.

The engine 10 is also equipped with a variable valve timing mechanism 58, which switches the opening/closing timing and the lift amount of the intake and/or exhaust valves between two types of timing characteristics, a characteristic for low engine speed and another characteristic for high engine speed, in response to the engine speed and the manifold pressure. The valve timing mechanism 58 also deactivates one of the two intake valves when the timing characteristic for low engine speed is selected so as to ensure stable combustion in the case of the lean air/fuel ratio control.

The valve timing mechanism 58 switches the characteristics by switching hydraulic pressure through an electromagnetic valve provided in the hydraulic pressure circuit. A hydraulic pressure sensor (not shown) is installed in the circuit and generates a signal indicating which characteristic is selected by the mechanism 58.

The outputs of the sensors are sent to an electronic control unit 60 (hereinafter referred to as "ECU").

The ECU 60 is a microcomputer comprising an input circuit 60a for receiving output signals from the aforesaid sensors and subjecting them to wave shaping, conversion to a prescribed voltage level and conversion from analog to digital form, a CPU (central processing unit) 60b, a memory means 60c for storing the processing programs executed by the CPU, processed data, etc., and an output circuit 60d. (The ECU 60 can be a single-chip microcomputer or can be constituted of discrete components.)

The memory means 60c is a computer-readable medium composed of ROM and RAM (with a backup section) and can be read by the computer (CPU 60b) using the programs represented by the flow charts of FIG. 2 and later figures explained later with regard to system operation.

The CPU 60b counts the number of the CRK signals to detect the engine speed NE and determines a basic fuel injection quantity TI based on the detected engine speed NE and the manifold absolute pressure PBA, and corrects the same by a desired air/fuel ratio and some similar parameters to determine an output fuel injection quantity TOUT, as follows.

$$TOUT = TI \times KCMDM \times KLAF \times K1 + K2$$

In the above, KCMDM is a correction coefficient obtained by conducting the charging efficiency adjustment on the desired air/fuel ratio KCMD. The desired air/fuel ratio KCMD is determined based on the engine operation parameters including the engine speed NE, the manifold absolute pressure PBA, the engine coolant temperature TW, etc. KCMD and KCMDM are both determined in terms of the equivalence ratio so that KCMD and KCMDM are 1.0 when the desired air/fuel ratio is the stoichiometric air/fuel ratio (=14.7: 1).

KLAF is a feedback correction coefficient determined using a PID control law such that the detected air/fuel ratio (obtained based on the output of the LAF sensor 46) converges to the desired air/fuel ratio KCMD.

K1 and K2 are other multiplication and additive correction factors, determined based on the engine operation parameters, used such that engine performance including fuel consumption and acceleration are optimized.

The fuel injection quantity is determined in terms of the opening period or time of the injector 18. The CPU 60b outputs a signal through the output circuit 60d in response to the determined fuel injection quantity TOUT to drive the injector 18 in synchronization with each TDC signal.

The operation of the system is explained with reference to the flow chart of FIG. 2. The program illustrated there is executed once every TDC signal.

The program begins in S10 in which it is determined whether a condition for conducting fuel cutoff (fuel cutoff control) is met. In the fuel cutoff, the output fuel injection quantity TOUT is determined to be zero and supply of fuel mixture into the engine cylinder is cut off.

Figure 3:
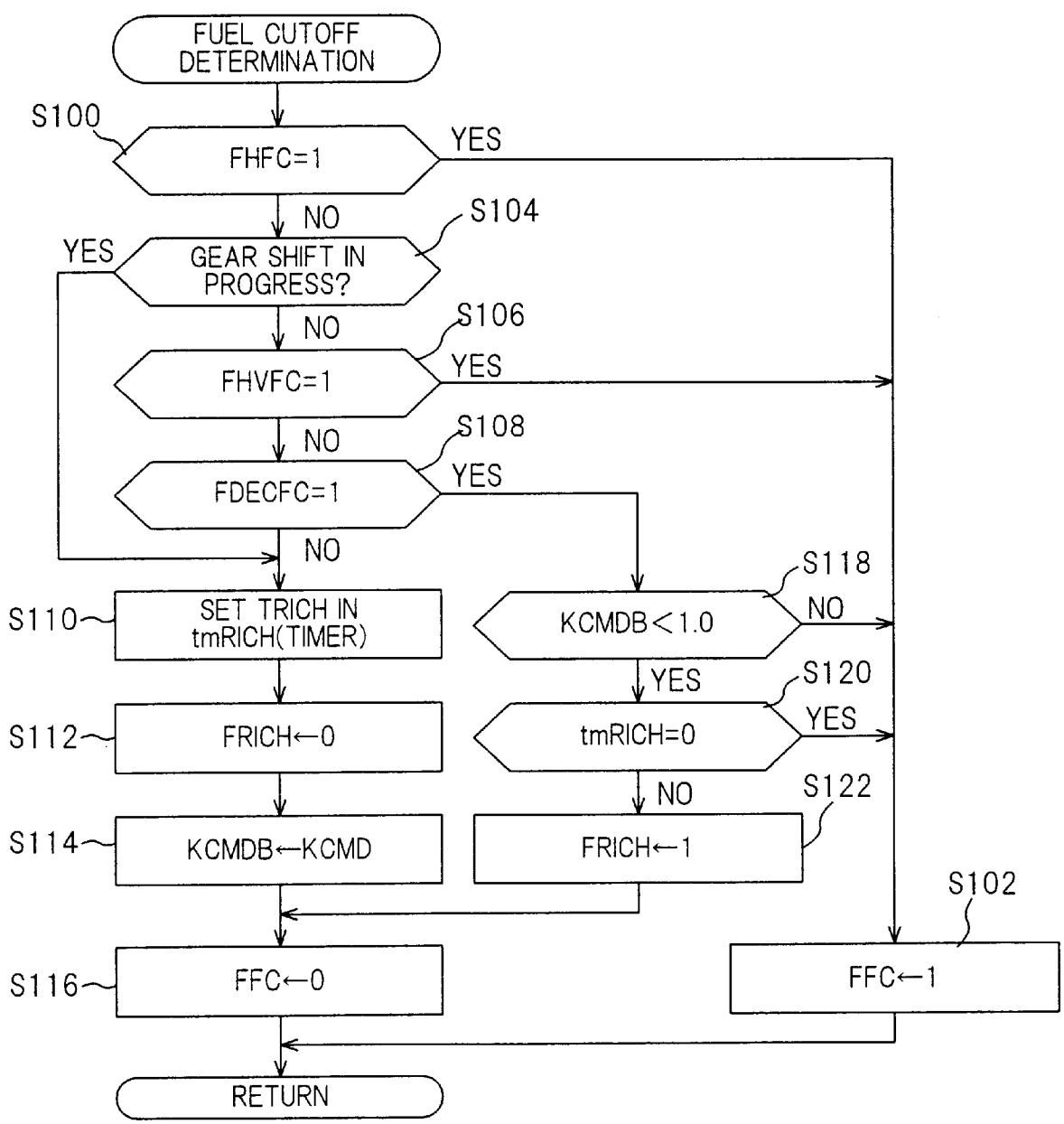
FIG. 3 is a flow chart showing the subroutine of the operation shown in FIG. 2, for determining whether fuel cutoff control should be conducted.

FIG. 3 is a subroutine flow chart of this discrimination.

Explaining this, the program begins in S100 in which it is determined whether the bit of a flag FHFC is set to 1. The flag bit is set to 1 in another routine (not shown) when the detected engine speed NE is greater than a predetermined engine speed such as 7000 rpm.

When the result is affirmative, the program proceeds to S102 in which the bit of a flag FFC is set to 1. Setting the flag bit to 1 indicates the condition for fuel cutoff is met (i.e., the fuel cutoff control should be made), while resetting it to 0 indicates the condition for fuel cutoff is not met (i.e., the fuel cutoff control should not be made).

When the result is negative, on the other hand, the program proceeds to S104 in which it is determined whether gear shift is in progress in the automatic transmission 52.

When the result is negative, the program proceeds to S106 in which it is determined whether the bit of a flag FHVFC is set to 1. The flag bit is set to 1 in another routine (not shown) when the detected vehicle speed V is greater than a predetermined vehicle speed such as 180 km/h. When the result is affirmative, the program proceeds to S102.

When the result is negative, on the other hand, the program proceeds to S108 in which it is determined whether the bit of a flag FDECFC is set to 1. The flag bit is set to 1 in another routine (not shown) when a fuel cutoff condition during vehicle deceleration is met.

The fuel cutoff condition during vehicle deceleration is determined to be met in the other routine when the throttle valve 16 is fully closed (or almost fully closed) and the detected engine speed NE remains not less than a predetermined engine speed NFC (e.g., 1800 rpm) for a predetermined time or period TFCDLY (e.g., 0.5 sec.), and the flag bit is set to 1. If the throttle valve 16 is opened or the engine speed NE drops below NFC, the flag bit is reset to 0.

When the result in S108 is negative, the program proceeds to S110 in which a timer tmRICH (down counter) is set with a value TRICH (defining a time or period for enrichment) and is started each time the program loops this step. The time TRICH is set to be increased with increasing estimated absorbed NOx amount STNOx (which will be referred to later).

When the result in S104 is affirmative, the program skips S106 and S108.

The program then proceeds to S112 in which the bit of a flag FRICH is reset to 0. Resetting the flag bit to 0 indicates not to conduct the fuel mixture enrichment (i.e., the rich fuel mixture supply control), while setting it to 1 indicates to conduct the fuel mixture enrichment.

The program then proceeds to S114 in which the desired air/fuel ratio KCMD at this time is rewritten as KCMDB and is stored in the memory means 60c, and to S116 in which the bit of the flag FFC is reset to 0.

On the other hand, when the result in S108 is affirmative, the program proceeds to S118 in which it is determined whether the stored value KCMDB is less than 1.0, in other words, it is determined whether the air/fuel ratio in the last program loop is leaner than the stoichiometric air/fuel ratio. More specifically, it is determined whether the lean fuel mixture supply control is in progress. If the result in S118 is negative, the program proceeds to S102.

If the result in S118 is affirmative, the program proceeds to S120 in which it is determined whether the value of the timer tmRICH has reached zero. If the program loop to this step is for the first time, the result is normally negative and the program proceeds to S122 in which the bit of the flag FRICH is set to 1, to S116 in which the bit of the flag FFC is reset to 0.

Figure 2:
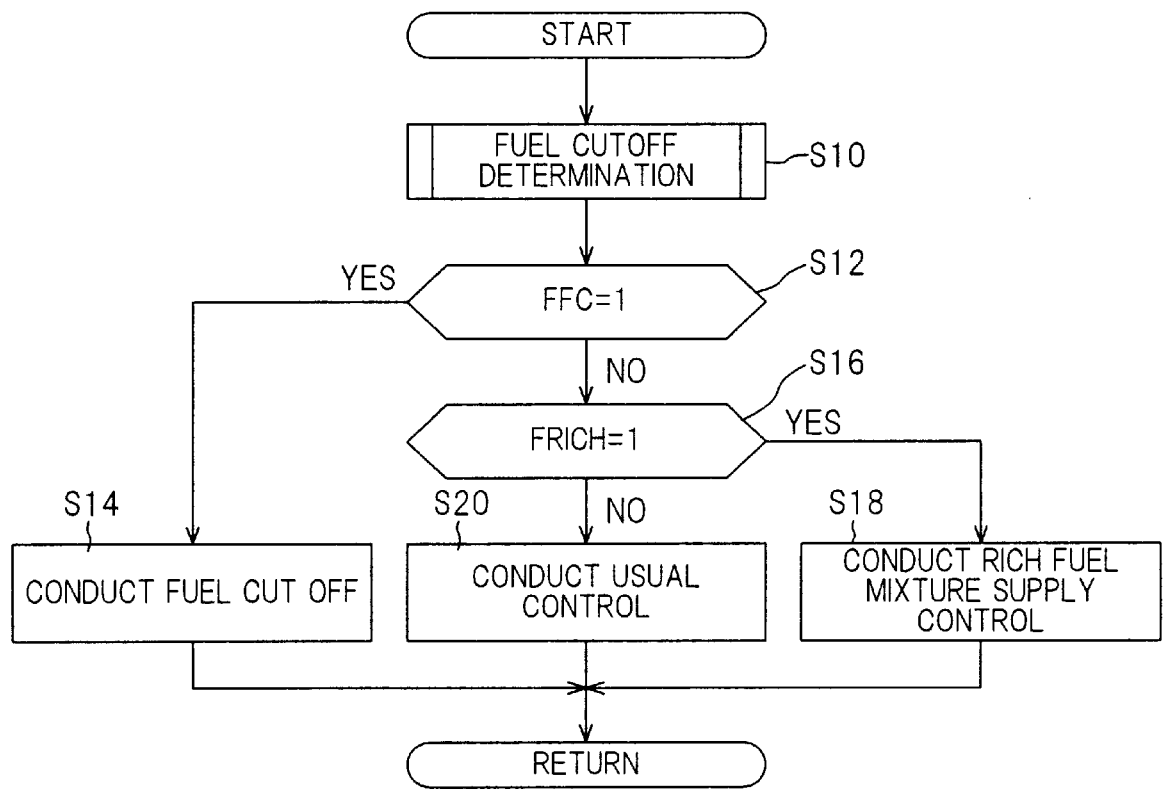
FIG. 2 is a flow chart showing the operation of the exhaust gas purification system of the internal combustion engine illustrated in FIG. 1.

Returning to the explanation of FIG. 2, the program proceeds to S12 in which it is determined whether the bit of the flag FFC is set to 1. When the result is affirmative, the program proceeds to S14 in which it is determined that fuel cutoff control is to be conducted, i.e., the output fuel injection quantity TOUT is set to zero such that the supply of fuel mixture into the engine 10 is cut off or discontinued.

On the other hand, when the result in S12 is negative, the program proceeds to S16 in which it is determined whether the bit of the flag FRICH is set to 1. When the result in S16 is affirmative, the program proceeds to S18 in which it is determined that the rich fuel mixture supply control is conducted, i.e., the desired air/fuel ratio correction coefficient KCMDM is set to be larger than 1.0 such that the fuel injection quantity TOUT is increased to enrich the fuel mixture to be supplied into the engine 10.

When the result in S16 is negative, the program proceeds to S20 in which it is determined that the usual control is conducted, i.e., the fuel injection quantity TOUT is to be determined in a usual manner. Specifically, it is discriminated based on the detected engine speed NE and the manifold absolute pressure PBA whether the lean fuel mixture control (in which the desired air/fuel ratio is set to be a value smaller than 1.0, i.e., a value leaner than the stoichiometric air/fuel ratio) or the stoichiometric fuel mixture supply control (in which the desired air/fuel ratio is set to 1.0 (the stoichiometric air/fuel ratio)) should be conducted. Based on the discrimination, the output fuel injection TOUT is determined in accordance with the equation mentioned above.

It should be noted in the above that in the lean fuel mixture supply control, the absorbed NOx amount STNOx (the NOx amount absorbed in the NOx reduction catalyst 249 is estimated based on the detected engine speed NE and the manifold absolute pressure PBA, and each time the estimated amount STNOx has reached a predetermined maximum amount STREF, the rich fuel mixture supply control is conducted.

Figure 4A:
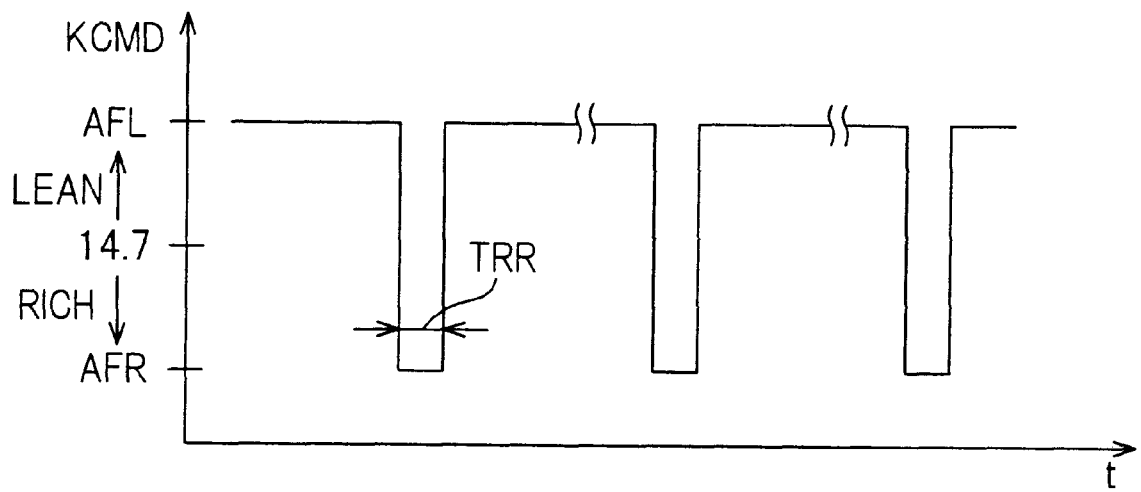
FIGS. 4A and 4B are time charts explaining the operation of the system illustrated in FIGS. 2 and 3.

To be more specific, as illustrated in FIG. 4A, the desired air/fuel ratio KCMD is set to a lean value AFL (which is greater than the stoichiometric air/fuel ratio (=14.7: 1)) in the lean mixture supply control.

Every time the estimated amount STNOx has reached the maximum amount STREF during this lean fuel mixture supply control, the desired air/fuel ratio KCMD is set to a rich value AFR (which is smaller than the stoichiometric air/fuel ratio) for a period or time TRR (e.g., 1.0 to 1.5 sec.), thus thereby enriching the fuel mixture intermittently. STREF is set to be slightly less than the maximum amount of NOx which the NOx reduction catalyst 24 can actually absorb.

Figure 4B:
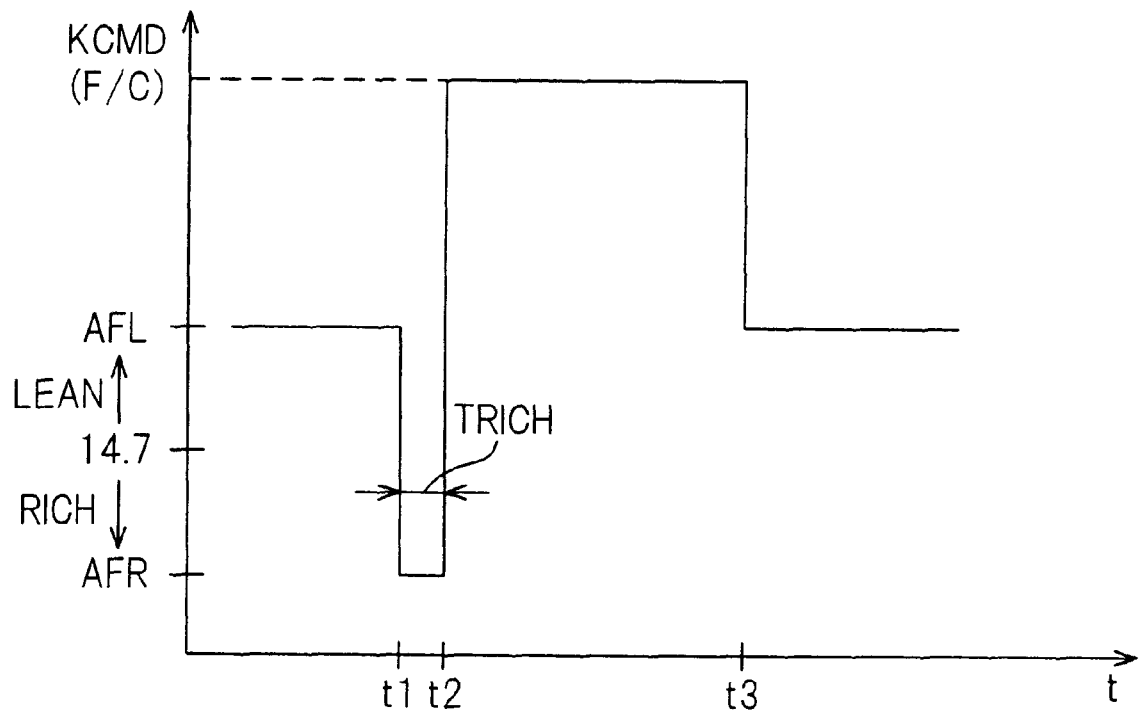

Moreover, if the fuel cutoff condition during vehicle deceleration is met during the lean fuel mixture supply control, as illustrated in FIG. 4B at time t1, the desired air/fuel ratio KCMD is similarly set to the rich value AFR for the aforesaid period or time TRICH to enrich the fuel mixture, and after that the fuel supply is cut off (at time t2 in the figure).

With this arrangement, since HC and CO are increased by the fuel mixture enrichment, the absorbed NOx is reduced by HC and CO and is regenerated before the fuel supply is cut off. As a result, when the engine operation returns to the lean fuel mixture supply control after the fuel cutoff, the NOx reduction catalyst 24 is able to absorb NOx sufficiently, thereby preventing the exhaust gas purification efficiency from being degraded. Since the time TRICH is set such that it increases with increasing estimated absorbed NOx amount STNOx, the NOx reduction catalyst is regenerated more effectively.

Moreover, since the enrichment is conducted each time the estimated amount STNOx has reached the maximum amount STREF during the lean fuel mixture supply control, the NOx catalyst 24 is unlikely to saturate to its absorption capacity limit during the lean fuel mixture supply control.

At the same time, since the HC and CO supplied before the fuel cutoff act with $O_2$ in the exhaust gas to burn and raise the exhaust temperature during fuel cutoff, the catalyst 24 is regenerated from SOx poisoning. The catalyst regeneration from SOx poisoning will be conducted more effectively in a second embodiment of the exhaust gas purification system of an internal combustion engine according to the invention.

Figure 5:
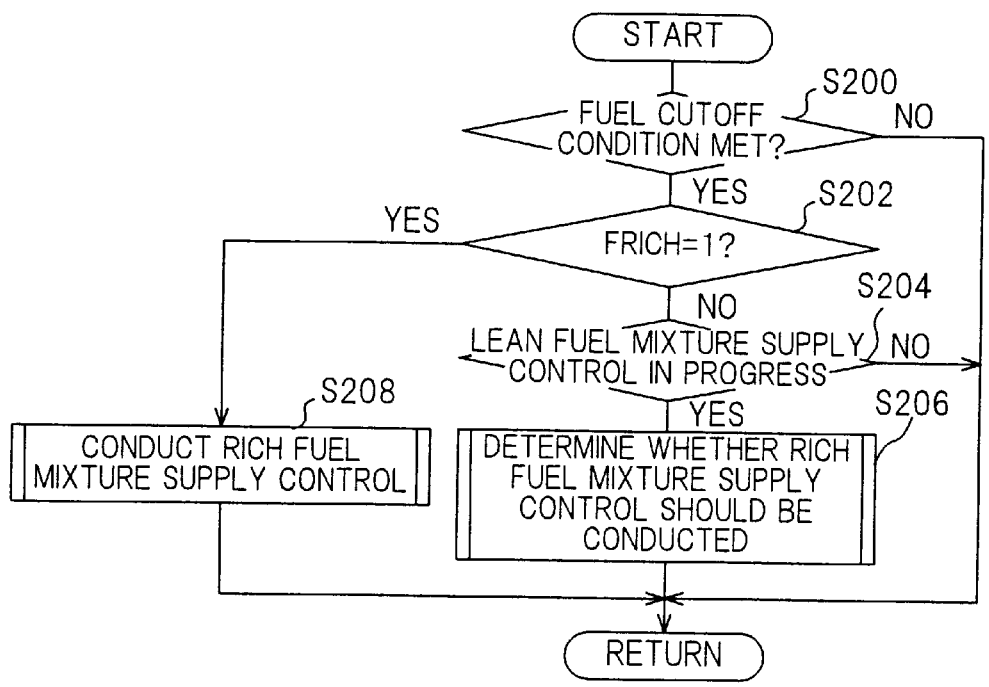
FIG. 5 is a flow chart, similar to FIG. 2, but showing the operation of the system according to a second embodiment of the invention.

FIG. 5 is a flow chart showing the operation of the second embodiment.

The program begins in S200 in which it is determined whether the aforesaid condition for fuel cutoff during vehicle deceleration is met. When the result is negative, the program is immediately terminated.

When the result is affirmative, on the other hand, the program proceeds to S202 in which it is determined whether the bit of the flag FRICH is set to 1. When the result is negative, the program proceeds to S204 in which it is determined whether the lean fuel mixture supply control is in progress. When the result in S204 is negative, the program is immediately terminated.

When the result in S204 is affirmative, on the other hand, the program proceeds to S206 in which it is again determined whether the rich fuel mixture supply control should be conducted.

Figure 6:
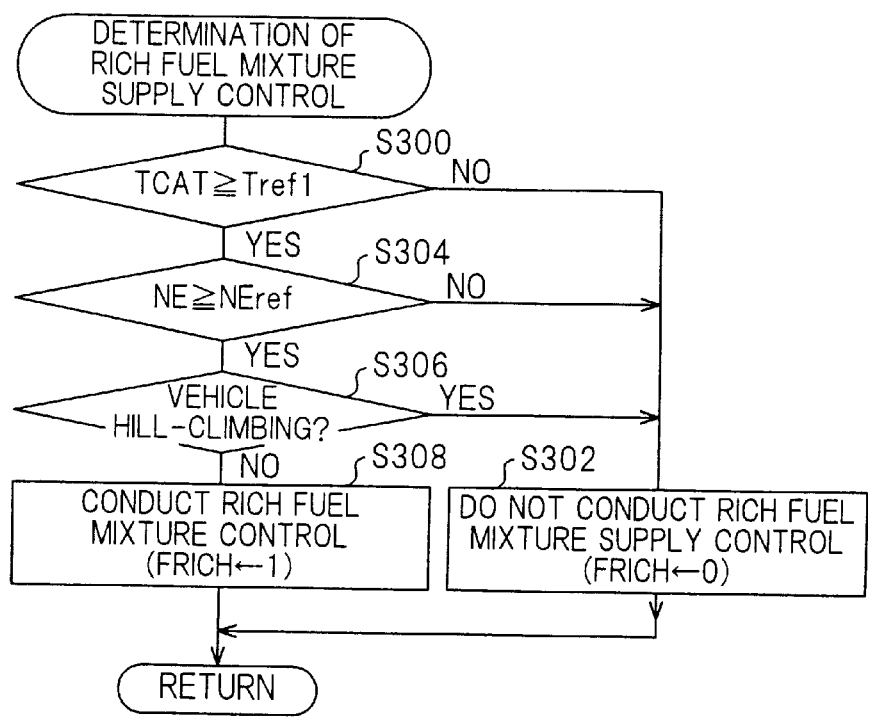
FIG. 6 is a flow chart showing the subroutine of the operation shown in FIG. 5, for determining whether rich fuel mixture supply control should be conducted.

FIG. 6 is a subroutine flow chart for this determination.

The program begins in S300 in which it is determined whether the temperature TCAT of the NOx reduction catalyst 24 is not less than a predetermined temperature Tref 1. The predetermined temperature Tref 1 is appropriately set to determine herein if the catalyst temperature TCAT has risen to a value, for example, within the range of 300° C. to 500° C. In other words, it is determined whether the catalyst temperature can further be raised such that the regeneration of the catalyst 24 can effectively conducted by the rich fuel mixture supply control.

When the result in S300 is negative, since this means that the detected catalyst temperature TCAT is relatively low and the desorption efficiency of NOx and SOx will be low if the rich fuel mixture supply control is conducted, the program proceeds to S302 in which it is determined that the rich fuel mixture supply control is not conducted and the bit of the flag FRICH is reset to 0.

On the other hand, when the result in S300 is affirmative, the program proceeds to S304 in which it is determined whether the detected engine speed NE is not less than a predetermined engine speed NEref (e.g., 1000 rpm). When the result in S304 is negative, the period of fuel cutoff is found to be relatively shortened in such a case and accordingly it is estimated to be insufficient to raise the catalyst temperature further so as to conduct the regeneration effectively, the program proceeds to S302.

When the result in S304 is affirmative, the program proceeds to S106 in which it is determined whether the vehicle is hill-climbing based on the output of the grade sensor 56. When the result in S306 is affirmative, since this means that the period of fuel cutoff is relatively shortened similarly in this case and accordingly it is estimated to be insufficient to raise the catalyst temperature further so as to conduct the regeneration effectively, the program similarly proceeds to S302.

When the result in S306 is negative, the program proceeds to S308 in which it is determined that the rich fuel mixture supply control is conducted and the bit of the flag FRICH is set to 1.

Returning to the explanation of the flow chart of FIG. 5, when the result in S202 is affirmative, the program proceeds to S208 in which it is determined that the rich fuel mixture supply control is conducted.

Figure 7:
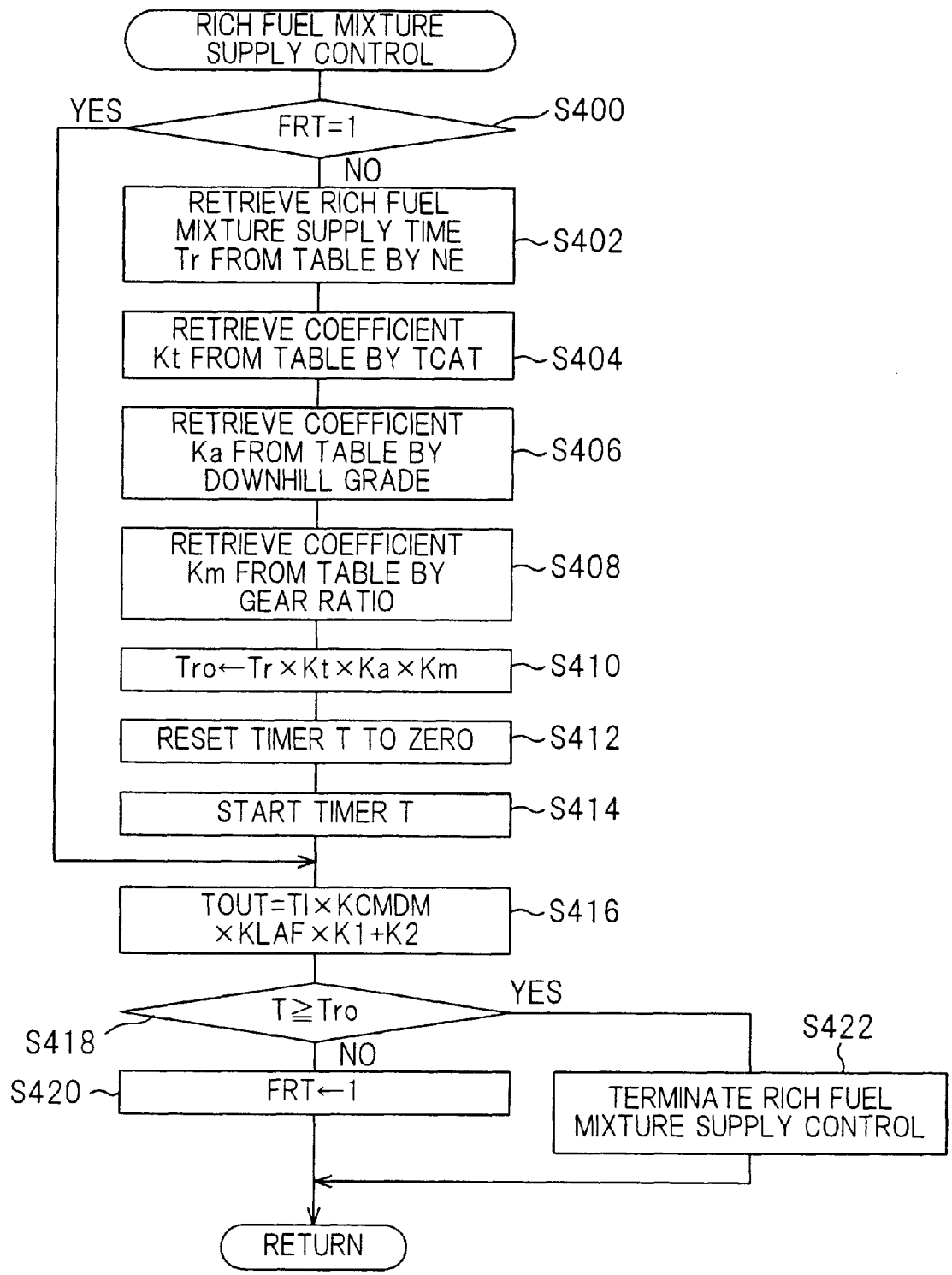
FIG. 7 is a flow chart showing the subroutine of the operation shown in FIG. 5, for conducting the rich fuel mixture supply control.

FIG. 7 is a subroutine flow chart showing this.

Explaining this, the program begins in S400 in which it is determined whether the bit of a flag FRT is set to 1. Since the flag bit is initially reset to 0, the result in S400 is normally negative and the program proceeds to S402 in which a time Tr for conducting the rich fuel mixture supply control continuously is retrieved from a table (whose characteristics are not shown) using, as an address datum, the detected engine speed NE at the time when the fuel cutoff should be conducted, i.e., at the time when the condition for fuel cutoff is met.

The program then proceeds to S404 in which a coefficient Kt (in multiplication for correcting the time Tr) is determined based on the detected catalyst temperature TCAT. Specifically, this is done by retrieving Kt from a table (whose characteristics are not shown) using the detected catalyst temperature TCAT as an address datum. The coefficient is set in the table data to be, for example, 0.9 when the catalyst temperature TCAT is high, so as to shorten the time Tr or, for example, 1.1 when the catalyst temperature TCAT is low, so as to elongate the time Tr.

The program then proceeds to S406 in which another coefficient Ka (in multiplication for correcting the time Tr) is determined by retrieval from a table (whose characteristics are not shown) using, as an address datum, the detected grade of a downhill (road) if the vehicle is traveling on such a road. If the vehicle is not travelling downhill, the coefficient is set to 1.0.

The program then proceeds to S408 in which still another coefficient Km (in multiplication for correcting the time Tr) is determined by retrieval from a table (whose characteristics are not shown) using the current gear ratio as an address datum.

The coefficients Ka and Km are also predetermined through experimentation so as to correct the time Tr to a proper value and stored as the table data to be retrieved by the parameters.

The program then proceeds to S410 in which the time Tr is multiplied by the coefficients to correct Tr. The corrected time is renamed as Tro. The program then proceeds to S412 in which a timer T (up-counter) is reset to zero, to S414 in which the timer T is started to count up.

The program then proceeds to S416 in which the output fuel injection quantity TOUT is calculated, as illustrated, in the manner explained above. Here, the desired air/fuel ratio correction coefficient KCMDM is set such that the desired air/fuel ratio KCMD is changed from a lean value to a rich value.

The program then proceeds to S418 in which it is determined whether the value of the timer T is not less than the corrected time Tro. When the result in S418 is negative, the program proceeds to S420 in which the bit of the flag FRT is set to 1. As a result, the program jumps from S400 to S416 in a next loop to continue the rich fuel mixture supply control until the result in S418 becomes affirmative. When it does, the program proceeds to S422 in which the rich fuel mixture supply control is terminated and the flag bit is reset to 0.

After this, the supply of fuel to the engine 10 is cut off in a routine (not shown).

Figure 8:
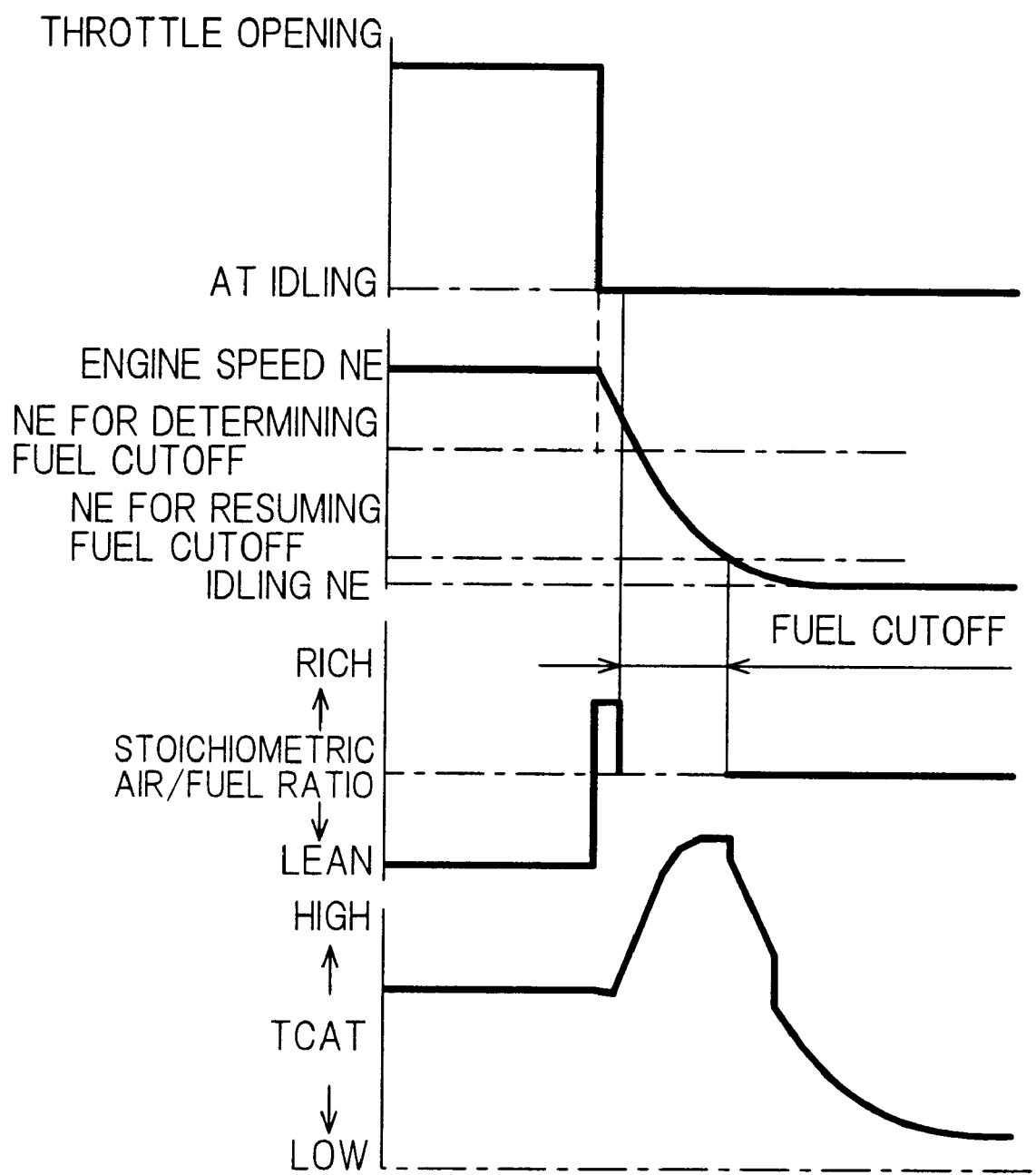
FIG. 8 is a time chart explaining the operation of the system illustrated in FIGS. 5 to 7.

The above will be explained with reference to a time chart shown in FIG. 8, which is in contrast with that of the prior art shown in FIG. 10.

As mentioned in the beginning, the temperature suitable for regeneration from SOx poisoning is higher than that for NOx reduction (i.e., 250° C. to 550° C.), and is approximately 600° C. in the rich environment. If it can be raised to approximately 700° C., the catalyst 24 will be regenerated from SOx poisoning more effectively.

Figure 10:
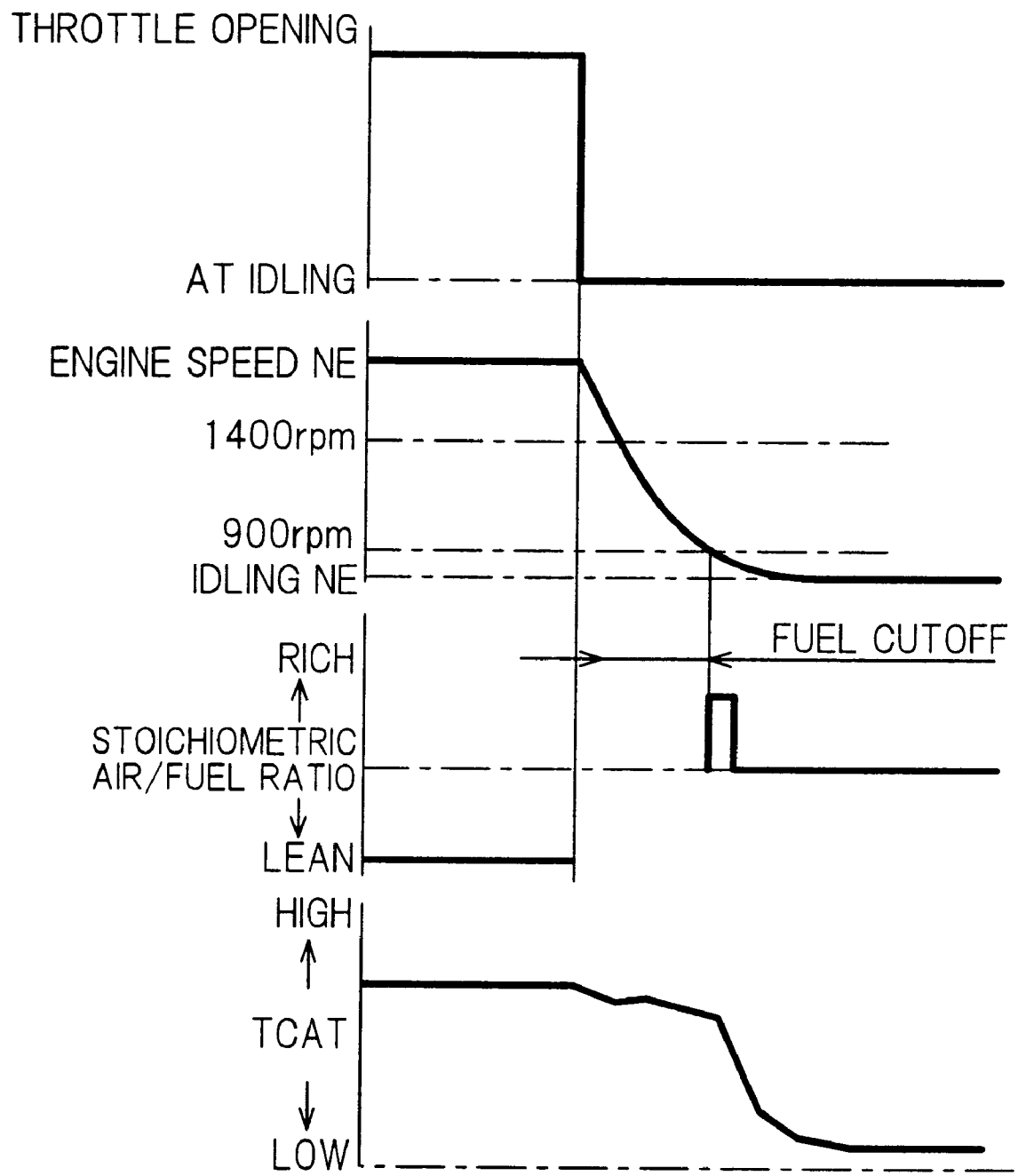
FIG. 10 is a time chart, similar to FIG. 8, but showing the operation of the prior art system.

In the prior art, as illustrated in FIG. 10, the rich fuel mixture supply control is conducted upon termination of the fuel cutoff. As a result, there is no HC or CO (which would otherwise act with $O_2$) during the fuel cutoff, and it is difficult to raise the catalyst temperature sufficiently during the fuel cutoff. Moreover, when the enriched fuel mixture is supplied upon termination of fuel cutoff, since the amount of $O_2$ is small, it is difficult to raise the catalyst temperature sufficiently.

In the present invention, on the other hand, the rich fuel mixture supply control is conducted and then, the fuel supply is cut off. More precisely, the rich fuel mixture is supplied immediately before the fuel cutoff.

With the arrangement, it becomes possible to supply the unburnt HC and CO in the rich fuel mixture injected immediately before the fuel cutoff as the agents for reduction, thereby enabling reduction and purification of the NOx absorbed in the catalyst 24.

Moreover, HC and CO supplied before the fuel cutoff act with $O_2$ in the exhaust gas to burn and raise the exhaust temperature during fuel cutoff as mentioned in the first embodiment. In the second embodiment, since the rich fuel mixture supply control before fuel cutoff is conducted only when it is expected that the catalyst temperature TCAT would rise to the temperature suitable for the regeneration from SOx poisoning, the catalyst 24 can be regenerated more effectively.

Figure 9:
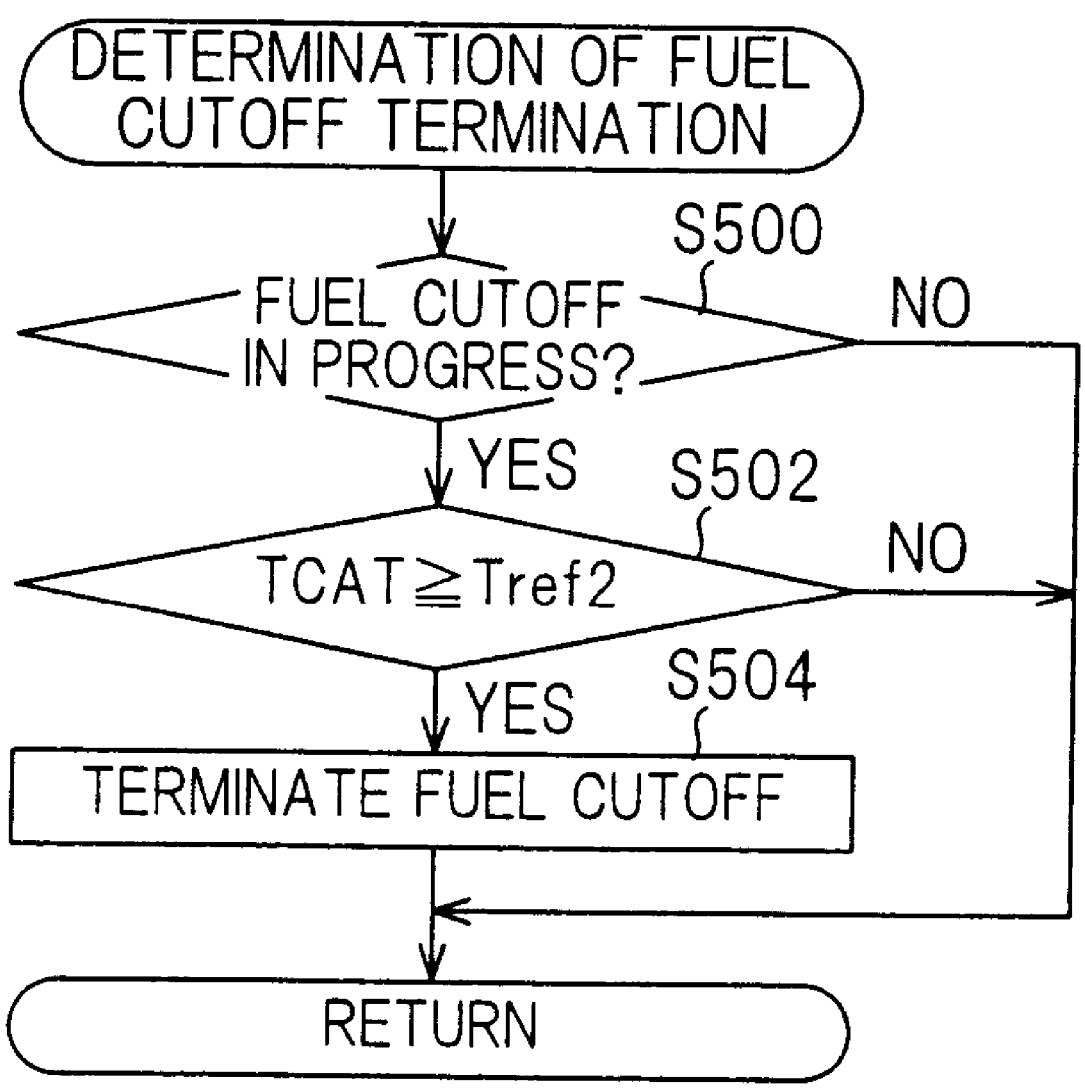
FIG. 9 is a flow chart showing the determination of whether the fuel cutoff conducted under the operation illustrated in FIGS. 5 to 7 should be terminated or discontinued.

FIG. 9 is a flow chart showing the determination of termination of the fuel cutoff. This operation is conducted in parallel with the control mentioned above.

The rich fuel mixture supply control may sometimes cause the exhaust temperature to rise excessively. If happens, the temperature of the catalyst 24 may similarly rise to an excessive extent, damaging the catalyst 24. The operation aims to avoid this.

Explaining the flow chart, the program begins in S500 in which it is determined whether the fuel cutoff is in progress. When the result is negative, the program is immediately terminated.

When the result is affirmative, the program proceeds to S502 in which it is determined whether the catalyst temperature TCAT is not less than a predetermined temperature Tref 2 (e.g., a value from 900° C. to 950° C.). When the result in S502 is negative, the program is immediately terminated.

When the result in S502 is affirmative, the program proceeds to S504 in which it is determined that the fuel cutoff is terminated and fuel supply is resumed with the desired air/fuel ratio set to a rich value or to the stoichiometric value.

With the arrangement, if the catalyst temperature is relative high, the oxygen concentration in the exhaust gas is lowered and an excessive temperature rise of the catalyst and the damage resulting therefrom can be avoided.

The embodiment is configured to have a system for purifying exhaust gas of an internal combustion engine, including: a NOx absorber (NOx reduction catalyst 24) installed in an exhaust system (exhaust pipe 22) of the engine (10) which absorbs NOx in exhaust gas generated by the engine in a lean environment and desorbs to reduce the absorbed NOx in a rich environment; vehicle driving condition detecting means for detecting a driving condition of a vehicle on which the engine is mounted (throttle position sensor 42, etc.); and fuel cutoff determining means (ECU 60, S10, S100–S122, S14, S200) for determining whether a condition for fuel cutoff, more precisely fuel cutoff during vehicle deceleration, in which supply of fuel to the engine is cut off, is met based on at least the detected driving condition of the vehicle; wherein the improvement comprises: rich fuel mixture supplying means (ECU 60, S18, S202–208) for supplying a fuel mixture richer than a stoichiometric fuel mixture to the engine for a first period (TRICH) if the condition for fuel cutoff is met when a fuel mixture leaner than the stoichiometric fuel mixture is supplied to the engine; and fuel cutoff conducting means (ECU 60, S14) for conducting the fuel cutoff upon after the supply of rich fuel mixture to the engine has been terminated.

In the system, the rich fuel mixture supplying means includes: estimating means for estimating an amount of NOx absorbed in the NOx absorber (STNOx) when the lean fuel mixture is supplied; amount comparing means for comparing the estimated amount of NOx with a predetermined amount (STREF); and lean fuel mixture supply discontinuing means for discontinuing the supply of lean fuel mixture and supplying the rich fuel mixture for a second period (TRR) when the estimated amount of NOx reaches the predetermined amount. In the system, the second period is a fixed time.

In the system, the rich fuel mixture supplying means includes: estimating means for estimating an amount of NOx absorbed in the NOx absorber when the lean fuel mixture is supplied; and first period determining means for determining the first period (TRICH) based on the estimated amount of NOx.

In the system, the rich fuel mixture supplying means includes: temperature detecting means (temperature sensor 48) for detecting a temperature of the NOx absorber (TCAT); temperature comparing means (ECU 60,S300) for comparing the temperature of the NOx absorber with a reference temperature (Tref 1); and rich fuel mixture supply determining means (ECU 60, S308) for determining the supply of the rich fuel mixture when the detected temperature is not less than the reference temperature.

In the system, the rich fuel mixture supplying means includes: engine speed detecting means (crank angle sensor 34) for detecting a speed of the engine (NE); engine speed comparing means (ECU 60, S304) for comparing the detected engine speed with a reference engine speed (NEref); and rich fuel mixture supply determining means (ECU 60, S308) for determining the supply of the rich fuel mixture when the detected engine speed is not less than the reference engine speed.

In the system, the rich fuel mixture supplying means includes: hill-climbing determining means whether the vehicle is hill-climbing (grade sensor 54, ECU 60, S106); and rich fuel mixture supply determining means (ECU 60, S308) for determining the supply of the rich fuel mixture when the vehicle is determined to be hill-climbing.

In the system, the rich fuel mixture supplying means includes: engine speed determining means (ECU 60, S400) for determining a speed of the engine when the condition for fuel cutoff is met; first basic value determining means (ECU 60, S402) for determining a basic value of the first period (Tr) based on the determined engine speed when the condition for fuel cutoff is met; temperature detecting means (ECU 60, S404) for detecting a temperature of the NOx absorber (TCAT); and correcting means (ECU 60, S416) for correcting the basic value of the first period based on the detected temperature of the NOx absorber.

The system further includes: downhill grade detecting means (ECU 60, S406) for detecting a grade of a downhill where the vehicle is running; and wherein the correcting means corrects the basic value of the first period based on the detected grade of the downhill.

The system further includes: gear ratio detecting means (ECU 60, S408) for detecting a gear ratio of the vehicle; and wherein the correcting means corrects the basic value of the first period based on the detected gear ratio.

In the system, the fuel cutoff conducting means includes: temperature detecting means (ECU 460, S502) for detecting a temperature of the NOx absorber (TCAT); and fuel cutoff terminating means (ECU 60, S504) for terminating the fuel cutoff when the detected temperature of the NOx absorber is not less than a predetermined temperature.

It should be noted in the above, although time TRICH is set to be increased with increasing estimated absorbed NOx amount STNOx, it is alternatively possible to set the time TRICH to a fixed value (e.g., 2.0 sec.) long enough that the whole amount of NOx absorbed in the NOx reduction catalyst 24 is desorbed and reduced.

It should also be noted in the above, although the invention has been described with an engine in which fuel is injected before the intake valves, the foregoing can also be applied to a direct-injection engine in which fuel is directly injected in the engine cylinder.

It should further be noted that, although the rich fuel mixture is supplied to the engine as the reduction agent, it is alternatively possible to provide an injector which injects a reduction agent directly to the engine exhaust.

It should further be noted that, although the NOx reduction catalyst or NOx absorber is provided with a three-way catalytic function, it is alternatively possible to equip a three-way catalyst separately from the NOx reduction catalyst.

It should further be noted that an $O_2$ sensor may be used instead of the aforesaid air/fuel ratio sensor that produces an output proportional to the oxygen concentration of the exhaust gas.

Although the invention has thus been shown and described with reference to specific embodiments, it should be noted that the invention is in no way limited to the details of the described arrangements but changes and modifications may be made without departing from the scope of the invention, which is defined by the appended claims.

What is claimed is:

1. A system for purifying exhaust gas of an internal combustion engine, including:
    a NOx absorber installed in an exhaust system of the engine which absorbs NOx in exhaust gas generated by the engine in a lean environment and desorbs to reduce the absorbed NOx in a rich environment;
    vehicle driving condition detecting means for detecting a driving condition of a vehicle on which the engine is mounted; and
    fuel cutoff determining means for determining whether a condition for fuel cutoff, in which supply of fuel to the engine is cut off, is met based on at least the detected driving condition of the vehicle;
    wherein the improvement comprises:
        rich fuel mixture supplying means for supplying a fuel mixture richer than a stoichiometric fuel mixture to the engine for a first period if the condition for fuel cutoff is met when a fuel mixture leaner than the stoichiometric fuel mixture is supplied to the engine; and
        fuel cutoff conducting means for conducting the fuel cutoff upon after the supply of rich fuel mixture to the engine has been terminated.

2. A system according to claim 1, wherein the rich fuel mixture supplying means includes:
    estimating means for estimating an amount of NOx absorbed in the NOx absorber when the lean fuel mixture is supplied;
    amount comparing means for comparing the estimated amount of NOx with a predetermined amount; and
    lean fuel mixture supply discontinuing means for discontinuing the supply of lean fuel mixture and supplying the rich fuel mixture for a second period when the estimated amoun of NOx reaches the predetermined amount.

3. A system according to claim 2, wherein the second period is a fixed time.

4. A system according to claim 1, wherein the rich fuel mixture supplying means includes:

estimating means for estimating an amount of NOx absorbed in the NOx absorber when the lean fuel mixture is supplied; and
    first period determining means for determining the first period based on the estimated amount of NOx.

5. A system according to claim 1, wherein the rich fuel mixture supplying means includes:
    temperature detecting means for detecting a temperature of the NOx absorber;
    temperature comparing means for comparing the temperature of the NOx absorber with a reference temperature; and
    rich fuel mixture supply determining means for determining the supply of the rich fuel mixture when the detected temperature is not less than the reference temperature.

6. A system according to claim 5, wherein the rich fuel mixture supplying means includes:
    engine speed detecting means for detecting a speed of the engine;
    engine speed comparing means for comparing the detected engine speed with a reference engine speed; and
    rich fuel mixture supply determining means for determining the supply of the rich fuel mixture when the detected engine speed is not less than the reference engine speed.

7. A system according to claim 5, wherein the rich fuel mixture supplying means includes:
    hill-climbing determining means for determining whether the vehicle is hill-climbing; and
    rich fuel mixture supply determining means for determining the supply of the rich fuel mixture when the vehicle is determined to be hill-climbing.

8. A system according to claim 1, wherein the rich fuel mixture supplying means includes:
    engine speed determining means for determining a speed of the engine when the condition for fuel cutoff is met;
    first basic value determining means for determining a basic value of the first period based on the determined engine speed when the condition for fuel cutoff is met;
    temperature detecting means for detecting a temperature of the NOx absorber; and
    correcting means for correcting the basic value of the first period based on the detected temperature of the NOx absorber.

9. A system according to claim 8, further including:
    downhill grade detecting means for detecting a grade of a downhill where the vehicle is running; and
    wherein the correcting means corrects the basic value of the first period based on the detected grade of the downhill.

10. A system according to claim 8, further including:
    gear ratio detecting means for detecting a gear ratio of the vehicle; and
    wherein the correcting means corrects the basic value of the first period based on the detected gear ratio.

11. A system according to claim 1, wherein the fuel cutoff conducting means includes:
    temperature detecting means for detecting a temperature of the NOx absorber; and
    fuel cutoff terminating means for terminating the fuel cutoff when the detected temperature of the NOx absorber is not less than a predetermined temperature.

12. A method of purifying exhaust gas of an internal combustion engine having a NOx absorber installed in an exhaust system of the engine which absorbs NOx in exhaust gas generated by the engine in a lean environment and desorbs to reduce the absorbed NOx in a rich environment; including the steps of:

detecting a driving condition of a vehicle on which the engine is mounted; and determining whether a condition for fuel cutoff in which supply of fuel to the engine is cut off, is met based on at least the detected driving condition of the vehicle;

wherein the improvement comprises the steps of:

supplying a fuel mixture richer than a stoichiometric fuel mixture to the engine for a first period if the condition for fuel cutoff is met when a fuel mixture leaner than the stoichiometric fuel mixture is supplied to the engine; and conducting the fuel cutoff upon after the supply of rich fuel mixture to the engine has been terminated.

13. A method according to claim 12, wherein the rich fuel mixture supplying step includes the steps of:

estimating an amount of NOx absorbed in the NOx absorber when the lean fuel mixture is supplied;

comparing the estimated amount of NOx with a predetermined amount; and discontinuing the supply of lean fuel mixture and supplying the rich fuel mixture for a second period when the estimated amount of NOx reaches the predetermined amount.

14. A method according to claim 13, wherein the second period is a fixed time.

15. A method according to claim 12, wherein the rich fuel mixture supplying means includes the steps of:

estimating an amount of NOx absorbed in the NOx absorber when the lean fuel mixture is supplied; and determining the first period based on the estimated amount of NOx.

16. A method according to claim 12, wherein the rich fuel mixture supplying step includes the steps of:

detecting a temperature of the NOx absorber;

comparing the temperature of the NOx absorber with a reference temperature; and determining the supply of the rich fuel mixture when the detected temperature is not less than the reference temperature.

17. A method according to claim 16, wherein the rich fuel mixture supplying step includes the steps of:

detecting a speed of the engine;

comparing the detected engine speed with a reference engine speed; and determining the supply of the rich fuel mixture when the detected engine speed is not less than the reference engine speed.

18. A method according to claim 16, wherein the rich fuel mixture supplying step includes the steps of:

determining whether the vehicle is hill-climbing; and determining the supply of the rich fuel mixture when the vehicle is determined to be hill-climbing.

19. A method according to claim 12, wherein the rich fuel mixture supplying step includes the steps of:

determining a speed of the engine when the condition for fuel cutoff is met;

determining a basic value of the first period based on the determined engine speed when the condition for fuel cutoff is met;

detecting a temperature of the NOx absorber;

correcting the basic value of the first period based on the detected temperature of the NOx absorber.

20. A method according to claim 19, further including the steps of:

detecting a grade of a downhill where the vehicle is running; and correcting the basic value of the first period based on the detected grade of the downhill.

21. A method according to claim 19, further including the steps of:

detecting a gear ratio of the vehicle; and correcting the basic value of the first period based on the detected gear ratio.

22. A method according to claim 12, wherein the fuel cutoff conducting step includes the steps of:

detecting a temperature of the NOx absorber; and terminating the fuel cutoff when the detected temperature of the NOx absorber is not less than a predetermined temperature.

23. A computer program embodied on a computer-readable medium for purifying exhaust gas of an internal combustion engine having a NOx absorber installed in an exhaust system of the engine which absorbs NOx in exhaust gas generated by the engine in a lean environment and desorbs to reduce the absorbed NOx in a rich environment; including the steps of:

detecting a driving condition of a vehicle on which the engine is mounted; and determining whether a condition for fuel cutoff in which supply of fuel to the engine is cut off, is met based on at least the detected driving condition of the vehicle;

wherein the improvement comprises the steps of:

supplying a fuel mixture richer than a stoichiometric fuel mixture to the engine for a first period if the condition for fuel cutoff is met when a fuel mixture leaner than the stoichiometric fuel mixture is supplied to the engine; and conducting the fuel cutoff upon after the supply of rich fuel mixture to the engine has been terminated.

\* \* \* \* \*